(No Model.)

J. F. WARD.
SYRINGE RESERVOIR.

No. 373,322. Patented Nov. 15, 1887.

WITNESSES:
Chas. H. Luther Jr.
Willie Fowler

INVENTOR:
James F. Ward
By Joseph A. Miller & Co.
Attys

UNITED STATES PATENT OFFICE.

JAMES F. WARD, OF PROVIDENCE, RHODE ISLAND.

SYRINGE-RESERVOIR.

SPECIFICATION forming part of Letters Patent No. 373,322, dated November 15, 1887.

Application filed July 19, 1887. Serial No. 244,706. (No model.)

*To all whom it may concern:*

Be it known that I, JAMES F. WARD, of Providence, in the county of Providence and State of Rhode Island, have invented certain new and useful Improvements in Syringe-Reservoirs, of which the following is a full, clear, and exact description, reference being had to the accompanying drawings, forming part of this specification.

This invention relates to a portable reservoir or fountain for supplying an ordinary syringe with liquid. In this class of articles great difficulty is experienced in securely attaching a hard coupling-piece within the tubular neck of the opening of the rubber reservoir.

One object of my invention is to provide a durable rubber reservoir having a single opening by which the reservoir may be filled and emptied.

Another object of my invention is to securely attach a hard coupling within a soft tube-like section or neck.

Another object of my invention is to provide novel means for carrying the reservoir by hand, and which, by virtue of its construction, will not weaken the structure of the reservoir, as is the case with the reservoirs having a handle secured directly to them.

To the above purposes my invention consists in the certain novel and peculiar constructions and arrangements of the several parts of the device, all as hereinafter fully described and claimed.

Figure 1:
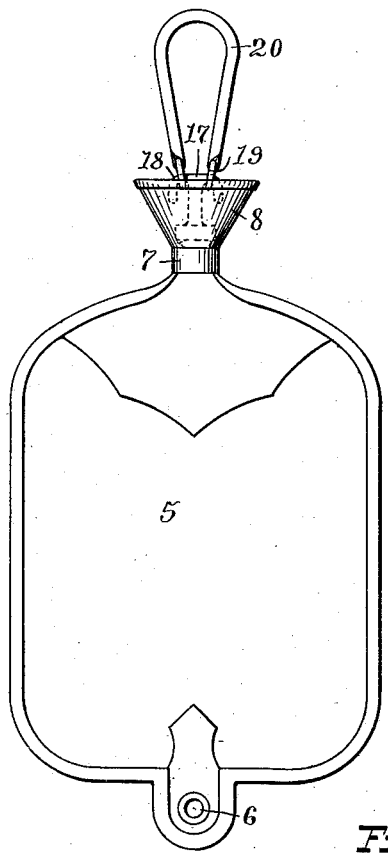
Figure 2:
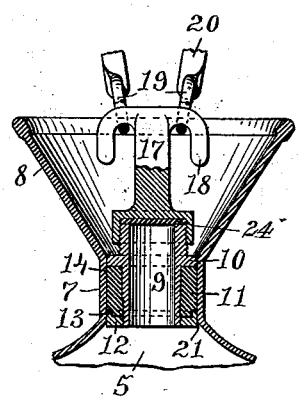
Figure 3:
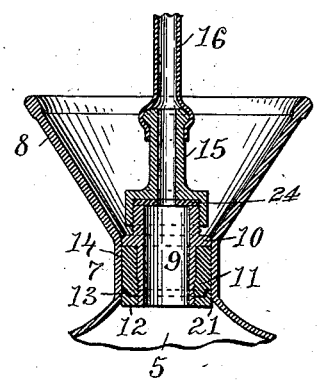
Figure 4:
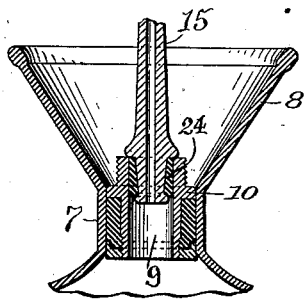

In the accompanying drawings, illustrating my invention, Figure 1 is a broadside view of my improved syringe-reservoir having a single opening and provided with the handle for carrying the device. Fig. 2 is an enlarged central vertical view in part of the device shown in Fig. 1, the handle being broken off. Fig. 3 is a view similar to that shown in Fig. 2, with the hooked member replaced by the nozzle, having a portion of the syringe-tube attached thereto. Fig. 4 is a view similar to that shown in Fig. 3, and shows another construction for attaching the nozzle to the coupling.

In the said drawings like numbers of reference designate corresponding parts throughout.

Referring to the drawings, the number 5 designates a pouch-shaped rubber reservoir, formed at the lower end with the suspending-eye 6, and provided at the upper end with the opening 7, which is elongated into a tube-like section or neck having the flaring mouth 8. The tubular coupling 9 is made of a hard material, preferably of metal, and is formed with an external flange, 10, and is provided with external screw-threads at the lower and upper ends thereof. Surrounding the coupling 9 is a jacket, 11, of a soft material, such as rubber, and this jacket is cemented to the exterior of the coupling and abuts with one end against the flange 10, while the other end thereof is engaged by the upper face of the screw-threaded collar 12, which works on the lower screw-threaded end of the coupling 9 and has its engaging face formed with the marginal rib 13. This collar serves to pack the jacket 11 tightly and acts to prevent the liquid from destroying the cemented joint 14 between the coupling and jacket. The coupling and its surrounding jacket are together adapted to fit snugly within the tubular section or neck 7, and are cemented therein by means of the rubber-cement joint 21. The parts are then vulcanized, so as to harden the rubber cement and to permanently unite the jacket 11 to the neck 7, thereby securely seating the coupling in position. The collar 12 also serves to protect the joint 21 from damage by the liquid.

When the reservoir is to be used to supply a syringe with liquid, it is filled with the liquid, and then the nozzle 15 is secured upon the upper end of the coupling, as shown in Fig. 3, and to the nozzle is attached the syringe-tube 16, which leads to the syringe, (not shown,) and in this condition the reservoir or fountain 5 is inverted and suspended by means of the eye 6 upon a peg, so as to supply the liquid to the syringe under slight pressure.

In order to conveniently carry the reservoir and to prevent straining the seams thereof, I have provided the detachable holder 17, having the lower end screw-threaded and adapted to be secured to the end of the coupling 9, and having the upper end provided with the two laterally-projecting hooks 18, which are engaged by the respective eyes 19, formed at the extremities of the removable handle 20.

In Fig. 4 the nozzle 15 is shown as secured to the nozzle 9 by means of the soft washer 24, which is fitted over the lower end of the nozzle, and then is forcibly seated within the coupling 9. The equivalent of this washer 24 is also found in the constructions shown in Figs. 2 and 3.

Having thus described my invention, I claim as new and desire to secure by Letters Patent—

1. The combination, as hereinbefore set forth, with a tubular section of rubber, of a hard coupling having an external flange, and a soft jacket—for example, of rubber—surrounding the coupling and abutting against the flange, a collar mounted on the coupling for packing the jacket and protecting the joint between the jacket and coupling, which together are appropriate to fit within the tubular section, substantially as and for the purpose herein described.

2. The combination, as hereinbefore set forth, with a tubular section of rubber, of an externally-flanged coupling having both ends externally screw-threaded, a soft jacket surrounding the coupling and cemented thereto and abutting against the flange thereof, a screw-threaded collar working on one end of the coupling and engaging one end of the jacket, a screw-threaded member adapted to fit upon the other end of the coupling, said coupling and jacket together fitting within the tubular section and cemented therein, substantially as and for the purpose herein described.

3. The combination, as hereinbefore set forth, with a tubular section of rubber, of a hard coupling having an external flange and provided with a surrounding soft jacket abutting against the flange, and a collar mounted on the coupling and engaging one end of the jacket, the engaging face of the collar formed with a marginal rib, substantially as and for the purpose herein described.

4. The combination, as hereinbefore set forth, with a reservoir provided with an opening formed with a tubular neck, of a coupling secured within the neck, and a detachable holder provided with hooks and adapted to be attached to the coupling, and a handle engaging with the hooks for carrying the reservoir, substantially as and for the purpose herein described.

5. The combination, as hereinbefore set forth, with the rubber neck 7, of the metallic coupling 9, having the external flange, 10, and formed with the external screw-threads at each end, the rubber jacket 11, surrounding the coupling and cemented thereto and having one end abutting against the flange 10, the collar 12, adapted to work on one end of the coupling and to pack the jacket which is cemented to the neck 7, substantially as and for the purpose herein described.

6. The combination, as hereinbefore set forth, with the soft tubular neck 7 and the hard coupling 9, secured therein, substantially as described, of the nozzle 15, provided with the washer 24 and secured to the coupling 9, substantially as and for the purpose herein described.

In witness whereof I have hereunto set my hand.

JAMES F. WARD.

Witnesses:
M. F. BLIGH,
J. A. MILLER, Jr.